(12) United States Patent
Neki et al.

(10) Patent No.: US 8,380,348 B2
(45) Date of Patent: Feb. 19, 2013

(54) ROBOT

(75) Inventors: Norio Neki, Wako (JP); Koji Okazaki, Wako (JP); Takashi Nakayama, Wako (JP); Masaaki Muromachi, Wako (JP); Satoshi Kaneko, Wako (JP); Yuta Kimura, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 313 days.

(21) Appl. No.: 12/812,189

(22) PCT Filed: Jan. 13, 2009

(86) PCT No.: PCT/JP2009/000091
§ 371 (c)(1),
(2), (4) Date: Jul. 8, 2010

(87) PCT Pub. No.: WO2009/090864
PCT Pub. Date: Jul. 23, 2009

(65) Prior Publication Data
US 2010/0286823 A1 Nov. 11, 2010

(30) Foreign Application Priority Data
Jan. 15, 2008 (JP) .................................. 2008-005955

(51) Int. Cl.
*G06F 19/00* (2006.01)

(52) U.S. Cl. ........ 700/245; 700/247; 700/248; 700/250; 700/251; 700/252; 700/253; 700/254; 700/258; 700/259; 700/261; 318/568.11; 318/568.13; 318/568.16; 318/568.19; 901/2; 901/3; 901/42; 235/462.09; 219/125.1; 451/5

(58) Field of Classification Search .................. 700/245, 700/189, 247, 248, 250, 521, 252, 253, 254, 700/258, 259, 261, 262; 320/107, 109, 113, 320/114; 701/26; 318/568.11, 568.13, 568.15, 318/568.16, 568.19; 29/712, 715, 739, 740, 29/743, 759, 832, 833, 834; 901/2, 3, 42; 235/462.09, 102; 219/125.1; 451/5
See application file for complete search history.

(56) References Cited

U.S. PATENT DOCUMENTS
(Continued)

FOREIGN PATENT DOCUMENTS
JP 07-191755 7/1995
JP 2007-164379 6/2007
(Continued)

*Primary Examiner* — McDieunel Marc
(74) *Attorney, Agent, or Firm* — Rankin, Hill & Clark LLP

(57) ABSTRACT

Provided is a robot capable of appropriately adjusting a position and the like of a main body in view of executing a specified task involving an interaction with a target object. While the position and posture of the main body (10) are being controlled according to a second target path, the robot (1) moves from a first specified area to a second specified area and stands there. In this state, a second position deviation (=the deviation of the position of the main body from a second target path) and a second posture deviation (=the deviation of the posture of the main body from a second target posture) are determined. According to the determination result, the second target path is corrected so that the subsequent position deviation and the like may be smaller.

5 Claims, 11 Drawing Sheets

U.S. PATENT DOCUMENTS

| | | | | |
|---|---|---|---|---|
| 6,732,015 B2* | 5/2004 | Maeda | | 700/245 |
| 7,289,884 B1* | 10/2007 | Takahashi et al. | | 700/245 |
| 7,525,281 B2* | 4/2009 | Koyanagi et al. | | 320/107 |
| 7,642,745 B2* | 1/2010 | Kaneko et al. | | 320/107 |
| 7,719,229 B2* | 5/2010 | Kaneko et al. | | 320/113 |
| 7,834,584 B2* | 11/2010 | Koyanagi et al. | | 320/107 |
| 7,873,448 B2* | 1/2011 | Takeda et al. | | 701/26 |
| 7,930,067 B2* | 4/2011 | Miyamoto et al. | | 700/264 |
| 2006/0043930 A1* | 3/2006 | Koyanagi et al. | | 320/114 |
| 2006/0217838 A1* | 9/2006 | Sugino et al. | | 700/245 |
| 2007/0069026 A1* | 3/2007 | Aoyama | | 235/462.09 |
| 2007/0216347 A1* | 9/2007 | Kaneko et al. | | 320/107 |
| 2008/0238365 A1* | 10/2008 | Kaneko et al. | | 320/109 |
| 2009/0149993 A1* | 6/2009 | Neki et al. | | 700/254 |

FOREIGN PATENT DOCUMENTS

JP   2007-245332   9/2007

* cited by examiner

BASIC POSITION PATH RELATED
TO THE SECOND TARGET PATH
BEFORE CORRECTION

BASIC POSITION PATH RELATED TO
THE SECOND TARGET PATH
AFTER CORRECTION

ROBOT

PRIORITY CLAIM

The present application is based on and claims the priority benefit of Japanese Patent Application 2008-005955 filed on Jan. 15, 2008, the contents of which are incorporated herein by reference in its entirety.

BACKGROUND OF THE INVENTION

1. Field of the Invention

The present invention relates to a robot capable of moving autonomously according to motions of a plurality of legs extended from a main body thereof.

2. Description of the Related Art

There has been disclosed a technical art for charging a battery mounted in a robot capable of moving autonomously (refer to Japanese Patent Laid-open No. 2007-245332). According to the technical art, a first connector mounted in a main body of the robot and a second connector mounted with a charging unit are connected for certain according to the movement of the robot guided by a guiding member disposed in a charging station.

Meanwhile, as a method of connecting the first connector with the second connector, in addition to the method of moving the robot to the charging unit, another method may be considered to drive the second connector by a driving device disposed with the charging unit to approach the first connector after the robot has been moved to a second specified area and is standing in the second specified area with a specified posture.

However, due to the reasons that the position or the posture or the position and the posture (hereinafter, referred to as position and the like where appropriate) of the second connector are deviated from the position where it should be, the interaction between the legs of the robot and the floor is different from what has been assumed or the like, despite that the robot is standing in the second specified area with a specified posture, it is possible that the position and the like of the first connector are inappropriate to be connected to the second connector. In this case, even moving the robot to the other area and making it move back to the second specified area with the same manner as the previous one and making it stand in the second specified area with the specified posture, it is still possible that the position and the like of the first connector are inappropriate to be connected to the second connector.

SUMMARY OF THE INVENTION

The present invention has been accomplished in view of the aforementioned problems, and it is therefore an object of the present invention to provide a robot capable of appropriately adjusting a position and the like of a main body in view of executing a specified task involving an interaction with a target object.

The present invention relates to a robot which is provided with a main body, a plurality of legs connected to the main body and a controller, and is capable of moving autonomously with repeated motions involving leaving a floor and landing on the floor of the plurality of legs controlled by the controller.

The controller in the robot of a first aspect of the present invention is provided with a first controlling element configured to determine a deviation of a position of the main body from a second target position as a second position deviation and a deviation of a posture of the main body from a second target posture as a second posture deviation when the robot is standing in a second specified area for executing a specified task involving an interaction with a target object, and a second controlling element configured to correct a second target path on the basis of either one or both of a current second position deviation and a current second posture deviation determined by the first controlling element so as to make either one or both of a subsequent second position deviation and a subsequent second posture deviation smaller after the robot has been controlled to move from the first specified area to the second specified area and stand in the second specified area with the position and posture of the main body following the second target path.

According to the robot of the first aspect of the present invention, the robot is made to move from the first specified area to the second specified area and stand there with the position and the posture of the main body following the second target path. The "target path" refers to one of temporal target variation behaviors of the position and the posture of the main body, respectively. The posture of the main body is defined by an azimuth angle or an azimuth angle and an elevation angle relative to a reference direction of the main body. "Standing" of the robot means that each leg stops moving. When the robot is standing in the second specified area, the second position deviation (=the deviation of the position of the main body from the second target path) and the second posture deviation (=the deviation of the posture of the main body from the second target posture) are determined. On the basis of either one or both of the current second position deviation and the current second posture deviation, the second target path is corrected so as to make either one or both of a subsequent second position deviation and a subsequent second posture deviation smaller. Thereby, the current position and the like of the main body when the robot has moved from the first specified area to the second specified area and is standing in the second specified area are closer to the second target position and the like than the previous position and the like of the main body when the robot has moved from the first specified area to the second specified area and is standing there in the previous time. In other words, the position and the like of the main body of the robot can be adjusted appropriately from the viewpoint of executing a specified task in the second specified area.

The robot of a second aspect of the present invention is dependent on the first aspect of the present invention, wherein the second controlling element controls the robot to move from the first specified area to the second specified area and stand in the second specified area with the position and posture of the main body following the corrected second target path after the robot has been controlled to move from the second specified area to the first specified area and stand in the first specified area with the position and posture of the main body following a first target path.

According to the robot of the second aspect of the present invention, the position and the posture of the main body are being controlled according to the first target path, the robot moves from the second specified area to the first specified area. Thereafter, with the position and the posture of the main body being controlled according to the corrected second target path, the robot moves back to the second specified area again and stands there. In other words, the robot returns back to the first specified area from the second specified area where the robot is standing and then moves back to the second specified area again and stands in the second specified area. Thereby, the position and the like of the main body can be adjusted appropriately from the viewpoint of making the robot execute the specified task.

The robot of a third aspect of the present invention is dependent on the second aspect of the present invention, wherein the first controlling element determines whether or not a second position/posture condition where the position of the main body is constrained in a second target position range with the second target position as a reference and the posture of the main body is constrained in a second posture range with the second target posture as a reference has been satisfied, and the second controlling element controls the robot to execute the specified task on condition that the first controlling element determines that the second position/posture condition has been satisfied, or controls the robot to move from the second specified area to the first specified area and stand in the first specified area with the position and posture of the main body following the first target path on condition that the first controlling element determines that the second position/posture condition has not been satisfied.

According to the robot of the third aspect of the present invention, the robot executes the specified task after the second position/posture condition has been satisfied, namely when the position and the posture of the main body are appropriate to make the robot execute the specified task. On the other hand, when the second position/posture condition is not satisfied, as aforementioned, the robot returns back to the first specified area from the second specified area where the robot is standing and then moves back to the second specified area again and stands in the second specified area. Thereby, the position and the like of the main body can be adjusted appropriately from the viewpoint of making the robot execute the specified task.

The robot of a fourth aspect of the present invention is dependent on the first aspect of the present invention, wherein the first controlling element determines whether or not a first position/posture condition where the position of the main body is constrained in a first target position range with a first target position as a reference and the posture of the main body is constrained in a first posture range with a first target posture as a reference has been satisfied when the robot is standing in the second specified area, and the second controlling element controls the robot to move from the first specified area to the second specified area and stand in the second specified area on condition that the first controlling element determines that the first position/posture condition has been satisfied.

According to the robot of the fourth aspect of the present invention, when the first position/posture condition has been satisfied, the robot moves from the first specified area to the second specified area with the position and the posture of the main body being controlled according to the second target path. Thereby, the target position and the target posture of the main body at the starting point of the second target path, namely, the target position and the target posture of the main body when the robot is standing in the first specified area after the correction is adjusted identical to that before the correction roughly. Even though the position and the like of the main body when the robot is standing in the second specified area are inappropriate in the previous time from the viewpoint of executing the specified task, the position and the like of the main body in the current time can be adjusted appropriately.

The robot of a fifth aspect of the present invention is dependent on the fourth aspect of the present invention, wherein the second controlling element, on condition that the first controlling element determines that the first position/posture condition has not been satisfied, controls the robot to vary either one or both of the position and posture of the main body by making a part of or the entire part of the plurality of legs of the robot which is standing in the first specified area leave the floor and land on the floor and stand again in the first specified area on the basis of either one or both of the position deviation of the main body from the first target position and the posture deviation of the main body from the first target posture.

According to the robot of the fifth aspect of the present invention, the current starting point of the second target path can be adjusted to satisfy the first position/posture condition by making the robot perform foot stepping in the first specified area. Thus, as mentioned above, the second target path is corrected, and the robot moves from the first specified area to the second specified area with the position and the posture of the main body being controlled according to the corrected second target path. Thereby, even though the position and the like of the main body when the robot is standing in the second specified area are inappropriate in the previous time from the viewpoint of executing the specified task, the position and the like of the main body in the current time can be adjusted appropriately.

The robot of a sixth aspect of the present invention is dependent on the first aspect of the present invention. The robot of the sixth aspect is further provided with a battery and a first connector, and the robot executes a task in which a second connector serving as the target object is driven by a driving device disposed with a charging unit to have a connection with the first connector and the battery is charged by the charging unit as the specified task.

According to the robot of the sixth aspect of the present invention, the position and the like of the main body can be adjusted appropriately; therefore, the robot can execute the task of connecting the second connector disposed with the charging unit to the first connector and charging the battery with the charging unit.

The robot of a seventh aspect of the present invention is dependent on the first aspect of the present invention. The robot of the seventh aspect is further provided with an arm connected to the main body and a hand connected to a tip end of the arm, and the robot executes a task of holding the target object with the hand or releasing the target object from the hand as the specified task.

According to the robot of the seventh aspect of the present invention, the position and the like of the main body can be adjusted appropriately; therefore, the robot can execute the specified task of holding the target object with the hand or releasing the target object from the hand through moving the arms and the like.

BRIEF DESCRIPTION OF THE DRAWINGS

FIG. 1lb is an explanatory diagram related to execute a specified task of holding a handle of the present invention;

DETAILED DESCRIPTION OF THE PREFERRED EMBODIMENTS

Hereinafter, an embodiment of a robot according to the present invention will be described with reference to the drawings. Descriptions will be firstly given on a structure of the robot.

Figure 1:
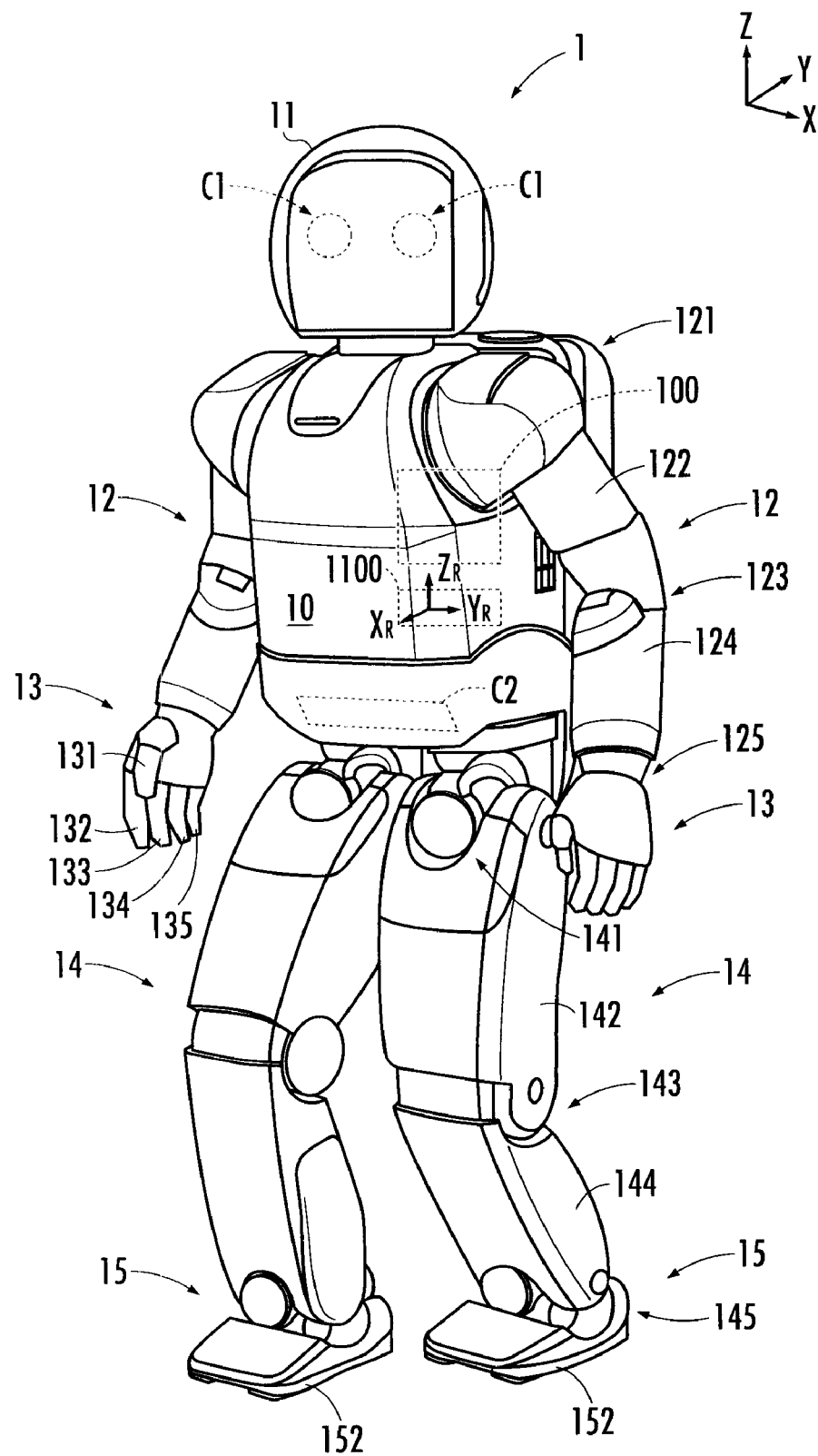
FIG. 1 is an explanatory diagram illustrating a structure of a robot of the present invention.

The robot 1 illustrated in FIG. 1 is a humanoid robot moving on legs. Similar to a human being, the robot 1 has a main body 10, a head 11 disposed at the upper end of the main body 10, right and left arms 12 which are provided at an upper portion of the main body 10 by extending from both sides thereof, respectively, right and left hands 13 provided at the respective end portion of the right and left arms 12, right and left legs 14 which are provided respectively at a lower portion of the main body 10 by extending downward thereof. The robot 1 is provided with a battery 1100 and a controller 100 configured to control the motions of the robot 1. It is acceptable that the controller 100 is a distributed control device composed of a main control unit and one or plural sub-control units which are connected via an internal network disposed in the robot 1.

The main body 10 is composed of an upper portion and a lower portion which are joined vertically in such a way that the two portions can rotate relatively around the yaw axis. The head 11 can move, for example rotate around the yaw axis with respect to the main body 10. The head 11 is mounted laterally with a pair of head cameras $C_1$, such as CCD cameras, infrared cameras and the like, which can sense lights of various wave bands and the front side of the robot 1 is set as a photographing range of the head cameras $C_1$. The lower portion of the main body 10 is mounted with a waist camera (active sensor) $C_2$ configured to determine a position, direction or the like of an object by emitting near infrared rays toward the object in a lower front region of the robot 1 and detecting reflection rays reflected from the object.

The arm 12 is provided with a first arm link 122 and a second arm link 124. The main body 10 and the first arm link 122 are joined through a shoulder joint mechanism (first arm joint mechanism) 121. The first arm link 122 and the second arm link 124 are joined through an elbow joint mechanism (second arm joint mechanism) 123. The second arm link 124 and the hand 13 are joined through a wrist joint mechanism (third arm joint mechanism) 125. The shoulder joint mechanism has degrees of rotation freedom around the roll axis, the pitch axis and the yaw axis. The elbow joint mechanism 123 has a degree of rotation freedom around the pitch axis. The wrist joint mechanism 125 has degrees of rotation freedom around the roll axis, the pitch axis and the yaw axis.

The hand 13 is provided with five finger mechanisms of 131 to 135 corresponding to the thumb, the index finger, the middle finger, the ring finger and the little finger of the human hand, respectively. The first finger mechanism 131 is disposed to face the other four laterally disposed finger mechanisms of 132 to 135. The first finger mechanism 131 is provided with three link members corresponding to the first metacarpal bone, the proximal phalanx and the distal phalanx of the thumb of the human hand, and an elastic cover covering the three link members. The three link members are joined through joints corresponding respectively to the basipod of the first metacarpal bone, the metacarpophalangeal joint and the interphalangeal joint of the thumb from the palm in order. The first finger mechanism 131 can bend at each joint according to a power transmitted from a motor housed in the palm through a power transmission mechanism composed of a deceleration mechanism or the like. The power transmitted from the motor to the first finger mechanism 131 is controlled by the controller 100. The finger mechanisms 132 to 135 have a similar or substantially configuration to a finger mechanism disclosed in, for example Japan Patent Laid-open No. 2003-181787. For example, the fifth finger mechanism 135 is provided with three link members corresponding to the proximal phalanx, the middle phalanx and the distal phalanx of the little finger of the human hand, and an elastic cover covering the three link members. The three link members are joined through joints corresponding respectively to the metacarpophalangeal joint, the proximal interphalangeal joint and the distal interphalangeal joint of the little finger of the human hand from the palm in order. The fifth finger mechanism 135 can bend inward at each joint according to a power transmitted from a motor (not shown) serving as a power source through a power transmission mechanism. Similar to the first finger mechanism 131, the power transmitted from the motor to the fifth finger mechanism 135 is controlled by the controller 100. The power transmission mechanism may be configured as a wire, a pulley or the like disclosed in the above-mentioned Japan Patent Laid-Open No. 2003-181787, or a mechanism which can transmit power from a motor to make each finger mechanism bend or stretch.

The leg 14 is provided with a first leg link 142, a second leg link 144 and a foot 15. The main body 10 and the first leg link 142 are joined through a hip joint mechanism (first leg joint mechanism) 141. The first leg link 142 and the second leg link 144 are joined through a knee joint mechanism (second leg joint mechanism) 143. The second leg link 144 and the foot 15 are joined through an ankle joint (third leg joint mechanism) 145. The hip joint mechanism 141 has degrees of rotation freedom around the roll axis, the pitch axis and the yaw axis. The knee joint mechanism 143 has degrees of rotation freedom around the pitch axis. The ankle joint mechanism 145 has degrees of rotation freedom around the roll axis and the pitch axis. The hip joint mechanism 141, the knee joint mechanism 143 and the ankle joint mechanism 145 constitute a "leg joint mechanism group". The translation and the degree of rotation freedom for each joint mechanism included in the leg joint mechanism group may be changed where appropriate. It is acceptable to omit any one joint mechanism in the hip joint mechanism 141, the knee joint mechanism 143 and the ankle joint mechanism 145 and constitute the leg joint mechanism group with a combination of the remained two joint mechanisms. Moreover, when the leg 14 is provided with a second leg joint mechanism different from the knee joint, the leg joint mechanism group may be constituted by including the second leg joint mechanism. In order to relieve impact when stepping on floor, the bottom of the foot 15 is disposed with an elastic element 152 as disclosed in Japan Patent Laid-Open No. 2001-129774.

"Motions" of each joint mechanism refer to that defined by a part of or the entire part of translations in three axial directions and rotations around three axes in the orthogonal coordinate system. "The robot 1 is standing" refers to a state where the motions of the legs 14, namely the motions of all the leg joint mechanisms included in the leg joint mechanism group are stopped.

Figure 2:
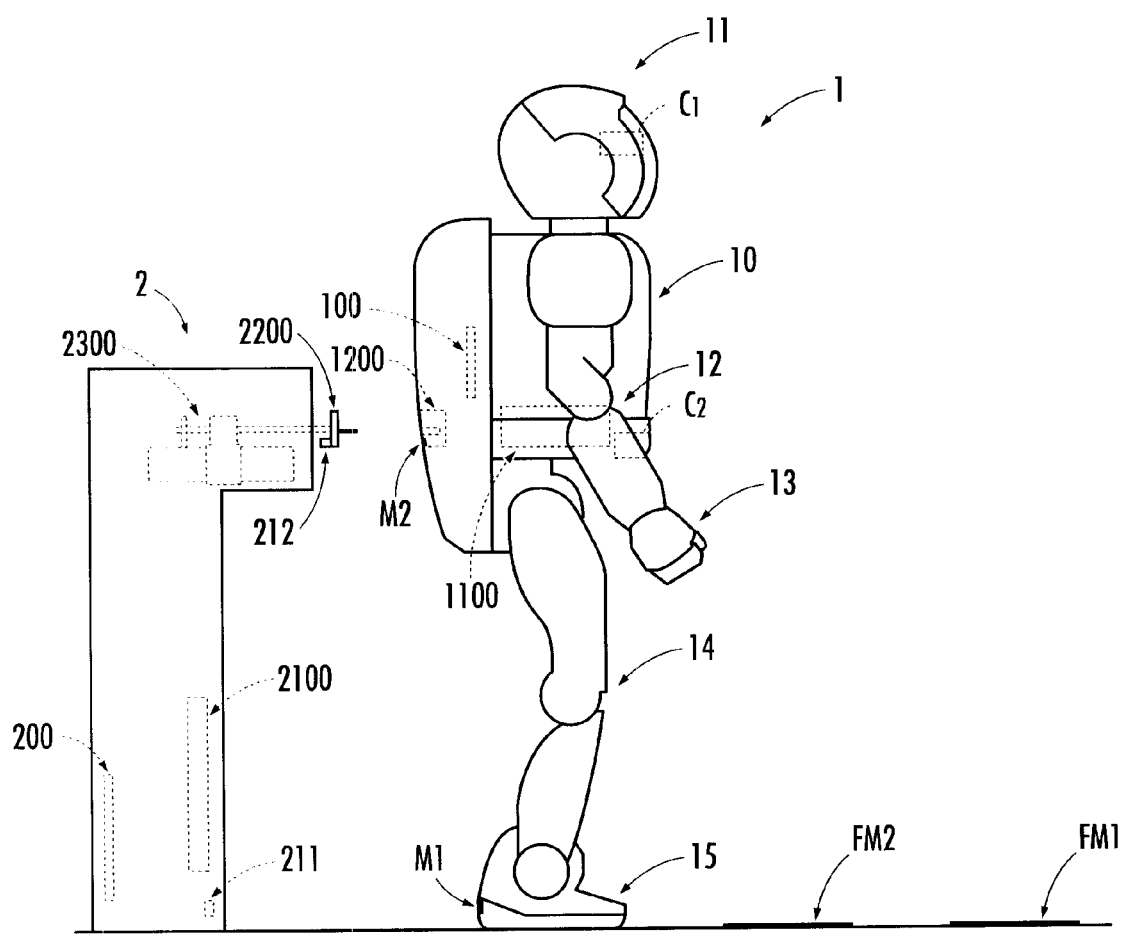
FIG. 2 is an explanatory diagram illustrating the structure of the robot and a charging unit configured to execute a specified task.
Figure 3:
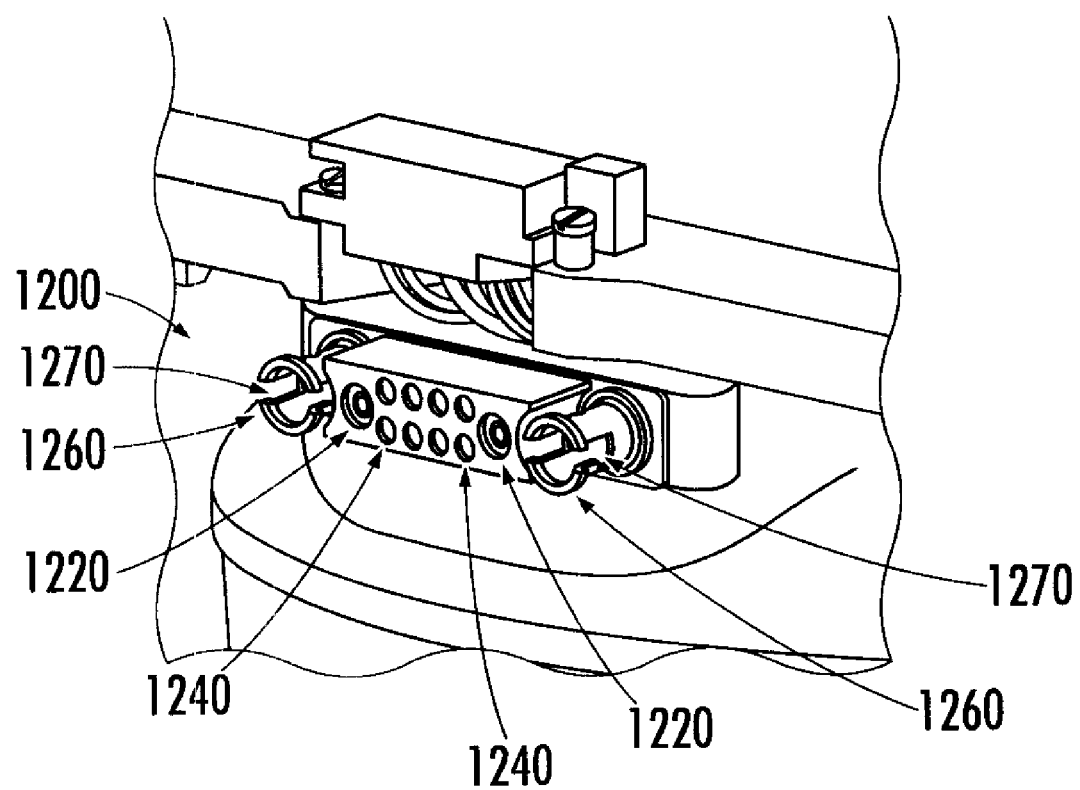
FIG. 3 is an explanatory diagram illustrating a structure of a first connector.
Figure 4:
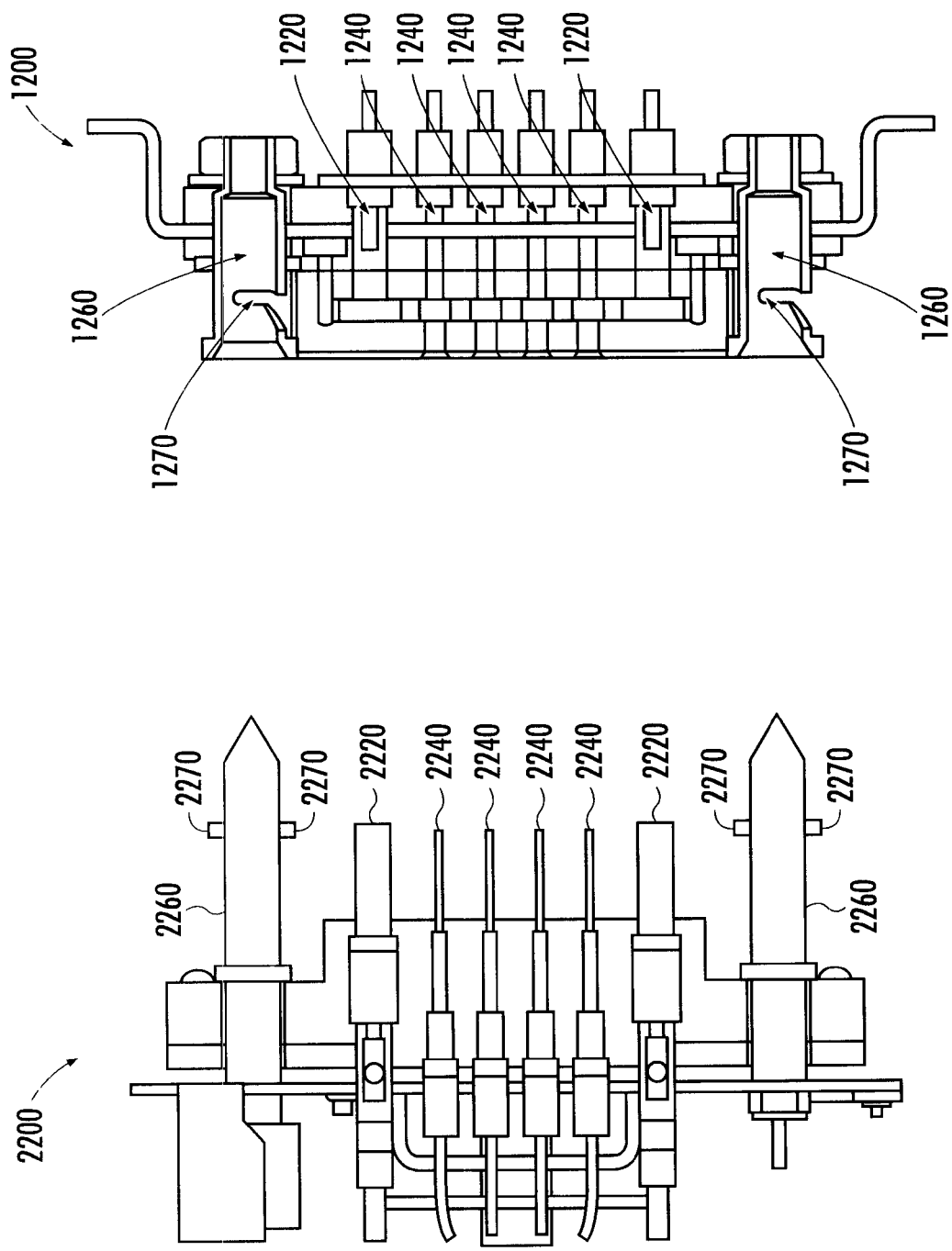
FIG. 4 is an explanatory diagram illustrating the structure of the first connector and a structure of a second connector.

As illustrated in FIG. 2, a first connector 1200 is disposed on the back surface side of the main body 10 for charging the battery 1100. As illustrated in FIG. 3 and FIG. 4, the first connector 1200 is provided with a first charging terminal 1220, a first signal terminal 1240 and a tube 1260 in parallel. The side wall of the tube 1260 is partially cut away to form a guide 1270.

The robot 1 executes a task such as charging the battery 1100 by the usage of a charging unit 2 illustrated in FIG. 2. The charging unit 2 is provided with a charging power source 2100, a charging controller 200 configured to control the operation of the charging unit 2, a second connector 2200 and a connector driving mechanism 2300. Furthermore, the charging unit 2 is provided with a first sensor 211 for detecting a first mark $M_1$ disposed at the heel of the robot 1 by the usage of light rays such as infrared rays or the like, and a second sensor 212 for detecting a second mark $M_2$ disposed on the back surface of the main body 10 of the robot 1 by usage of light rays such as infrared rays or the like.

Figure 5:
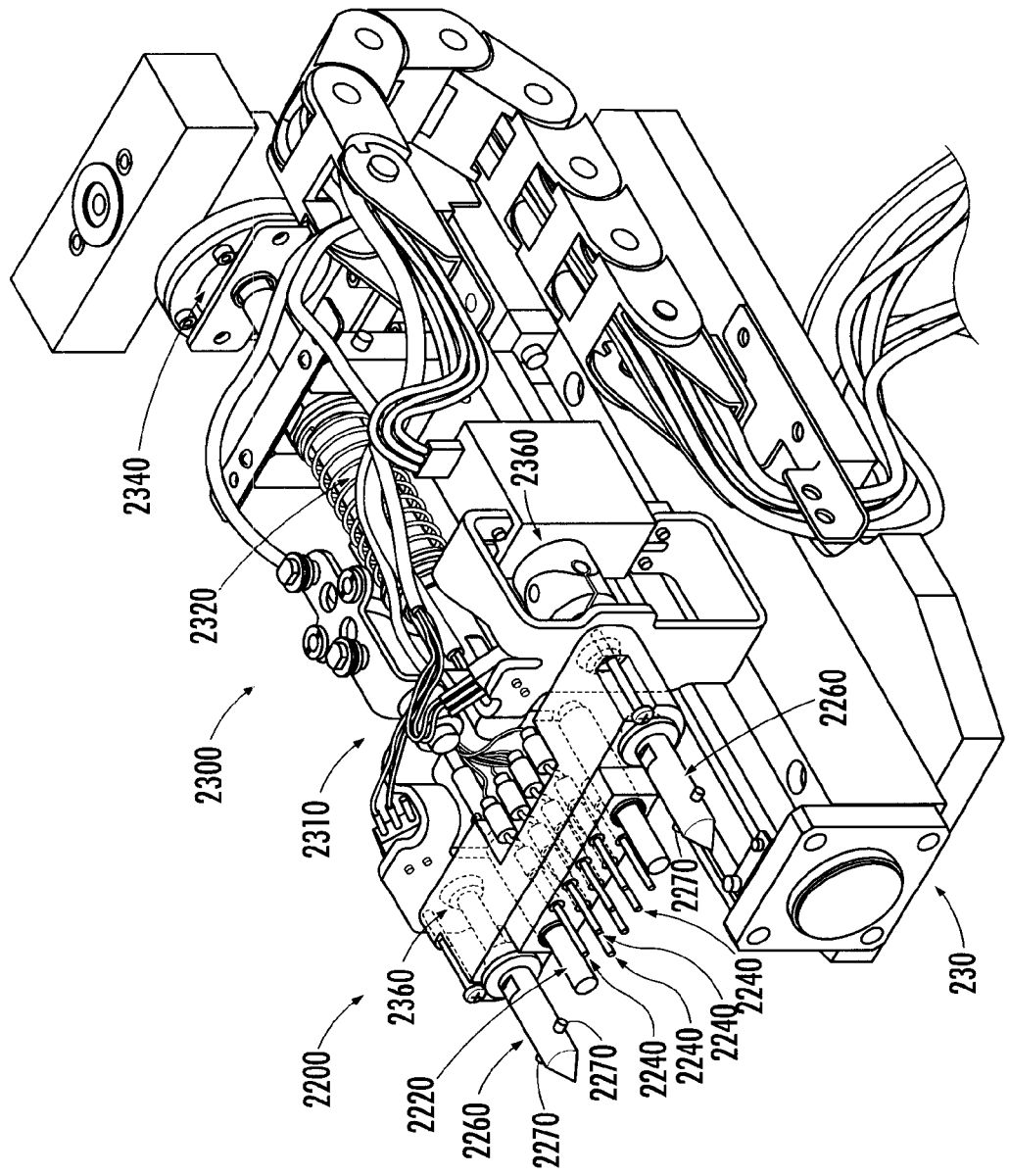
FIG. 5 is an explanatory diagram illustrating the structure of the charging unit.

As illustrated in FIG. 4 and FIG. 5, the second connector 2200 is disposed with a second charging terminal 2220, a second signal terminal 2240 and a rod 2260 in parallel, protruding out in the horizontal direction. The side wall of the rod 2260 is disposed with a pair of pins 2270. The rod 2260 is disposed in the second connector 2220 in such a way that it can be made to move or quiver in the radial direction by a compliance mechanism.

The connector driving mechanism 2300 is a driving mechanism of a cylinder type. As illustrated in FIG. 5, the connector driving mechanism 2300 is provided with a base 230, a slider 2310, a cylinder rod 2320, a compliance mechanism 2340, and a rod rotating mechanism 2360. The second connector 2200 is disposed at the tip end of the slider 2310. The cylinder rod 2320 is configured to slide the slider 2310 on the base 230 reciprocatively. The compliance mechanism 2340 is configured to maintain the cylinder rod 2320 in such a way that it can move or quiver in the radial direction. The rod rotating mechanism 2360 is configured to drive the rod 2260 to rotate axially. The position of the second connector 2200 is determined on the basis of a shifted amount of the slider 2310 driven by the cylinder rod 2320. In addition to the horizontal direction, it is acceptable that the second connector 2200 may be driven to move back and forth in a direction along which a horizontal force is applied to the robot 1 in a back ward motion.

When the first connector 1200 and the second connector 2200 are in a connected state, the first charging terminal 1220 and the second charging terminal 2200 are connected, the first signal terminal 1240 and the second signal terminal 2240 are connected, the rod 2260 is inserted into the tube 1260, and the pins 2270 are engaged to the tip end portion of the guide 1270.

On the other hand, when the first connector 1200 and the second connector 2200 are in a disconnected state, the first charging terminal 1220 and the second charging terminal 2220 are separated, the first signal terminal 1240 and the second signal terminal 2240 are separated, the engagement between the pins 2270 and the end portion of the guide 1270 is released, and the rod 2260 is pulled out from the tube 1260.

Figure 6:
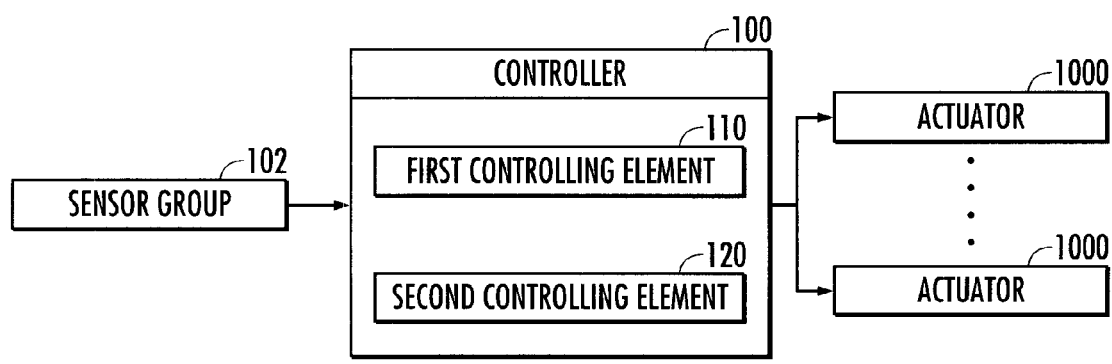
FIG. 6 is an explanatory diagram illustrating a structure of a controller in the robot of the present invention.

The controller 100 illustrated in FIG. 6 is comprised of a CPU, a ROM, a RAM, an I/O and the like and is configured to control actions of the robot 1 through controlling operations of actuators 1000 according to an action plan stored in a storing unit and output signals from each sensor in a sensor group 102. The action plan includes therein a target path denoting temporal target variation behaviors of the position and the posture of the main body 10.

In addition to the head camera $C_1$ and the waist camera $C_2$, the sensor group 102 includes an inclination angle sensor configured to output a signal according to an inclination angle or a posture of the main body 10 with respect to the horizontal plane, a yaw rate sensor configured to output a signal according to an angular velocity around the yaw axis of the robot 1, an acceleration sensor configured to output a signal according to accelerations in the roll axial direction, the pitch axial direction and the like of the robot 1, a rotary encoder configured to output a signal according to a joint angle of each joint, and the like.

On the basis of the outputs from the sensors constituting the sensor group 102, a position of the origin of the robot coordinate system $(X_R, Y_R, Z_R)$ illustrated in FIG. 1 in the fixed coordinate system or the global coordinate system (X, Y, Z), or a translation matrix or a quaternion denoting translation to the position in the fixed coordinate system is determined as a position of the main body 10. An azimuth angle and an elevation angle in the fixed coordinate system in the $+Z_R$ direction of the robot coordinate system, or a rotation matrix or a quaternion denoting rotations of only the azimuth angle and the elevation angle in the fixed coordinate system is determined as a posture of the main body 10.

The controller 100 is provided with a first controlling element 110 and a second controlling element 120. The first controlling element 110 is configured to determine sufficiency of a condition to be described hereinafter, and the second controlling element 120 is configured to control actions of the robot 1 according to the determination result from the first controlling element 110.

Figure 9:
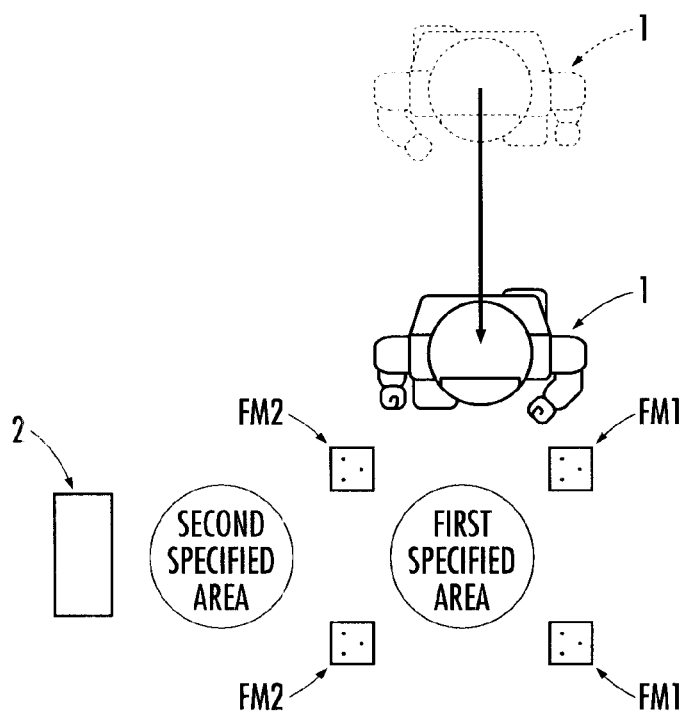
FIG. 9a is an explanatory diagram related to moves toward a first specific area in front of the charging unit of the present invention.
FIG. 9b is an explanatory diagram related to stand in the first specific area with the back facing the charging unit of the present invention.
FIG. 9c is an explanatory diagram related To moves from the first specified area backward to a second specified area of the present invention.
Figure 9:
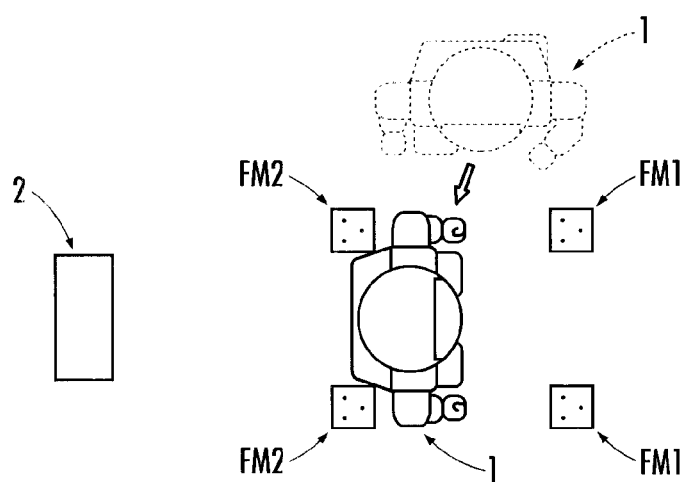
Figure 9:
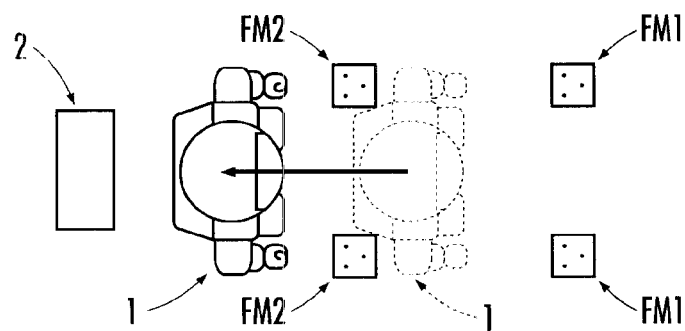

Functions of the robot 1 with the aforementioned configuration will be described. A summary of the functions of the robot 1 is described. First, as illustrated in FIG. 9(a), the robot 1 moves toward a first specified area in front of the charging unit 2. Thereafter, as illustrated in FIG. 9(b) the robot 1 stands in the first specified area with the back thereof facing the charging unit 2. Then, as illustrated in FIG. 9(c) the robot 1 moves from the first specified area backward to a second specified area and stands there with the back thereof facing the charging unit 2. Thereafter, the robot 1 stands in the second specified area and executes a specified task by connecting the first connector 1200 to the second connector 2200 and charging the battery 1100 with the charging unit 2.

Figure 7:
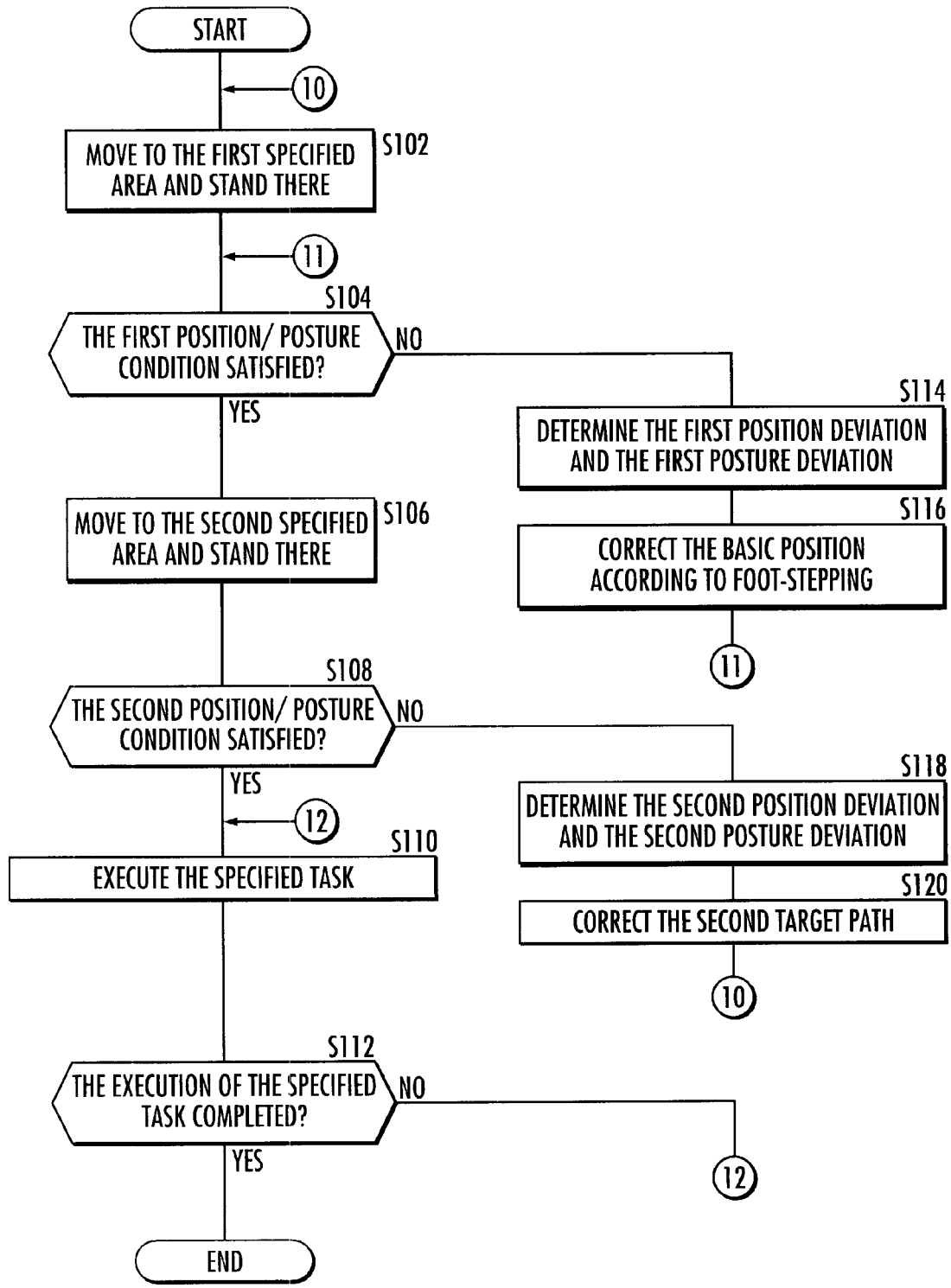
FIG. 7 is a flow chart illustrating a controlling method of a position and a posture of the robot.

The mentioned series of actions of the robot 1 will be described in detail hereinafter. First, when the robot 1 is going to move toward the first specified area, the position and posture of one or both of floor marks $FM_1$ and $FM_2$ are determined according to an image of the ambient of the robot 1 photographed by, for example, the waist camera $C_2$, and an action plan is made according to the determination result. Thereafter, motions of the robot 1 including the motions of the leg joint mechanism group are controlled according to the action plan to make the robot 1 move toward the first specified area as illustrated in FIG. 9(a) and stand in the first specified area with the back thereof facing the charging unit 2 as illustrated in FIG. 9(b) (FIG. 7/S102). When the robot 1 is standing there, all the motions of the leg joint mechanisms included in the leg joint mechanism group are stopped, as illustrated in FIG. 2, and the actuator 1000 is supplied with power to keep the robot 1 standing there with the legs 14 slightly bent at the respective knee joint mechanism 143.

When the robot 1 is standing in the first specified area, the first controlling element 110 determines whether or not a first position/posture condition has been satisfied (FIG. 7/S104). The first position/posture condition is a condition where the position of the main body 10 is constrained in a first target position range with a first target position as a reference and the posture of the main body 10 is constrained in a first target posture range. The first target position range and the first target posture range are defined from the viewpoint of adjusting the position and the posture of the main body 10 identically every time when the robot 1 moves to the first specified area and stands there. The defined first target position range and first target posture range are stored in a storing unit. Each relative position and each relative posture of the main body 10 with respect to the first floor mark $FM_1$ are determined as the position and the posture of the main body 10. The position and the posture of the first floor mark $FM_1$ with respect to the waist camera $C_2$ are determined through the waist camera $C_2$; on the basis of the determination result and the positions and the postures or the like of the waist camera $C_2$ (or an light-receiving element of the waist camera $C_2$) in the robot coordinate system which are stored preliminarily in the storing unit, the relative position and the relative posture of the main body 10 with respect to the first floor mark $FM_1$ can be determined. The position and the posture of the main body 10 may be determined on the basis of outputs from other sensors according to an inverse dynamic or geometric computation model, for example, on the basis of output signals from rotary encoders denoting angles of each joint mechanism, and the length or the like of each link stored preliminarily in a storing unit. Moreover, whether or not the first position/posture condition is satisfied may be determined by determining whether or not each position and each posture of the first floor mark $FM_1$ determined via the waist camera $C_2$ when the robot 1 is standing in the first specified area is identical to or in a predefined error range of the target position and target posture of the first floor mark $FM_1$ stored in a storing unit.

When the first controlling element 110 determines that the first position/posture condition has not been satisfied (FIG. 7/S104 . . . NO), the deviation of the position of the main body 10 from the first target position is determined as a first position deviation and the deviation of the posture of the main body 10 from the first target posture is determined as a first posture deviation (FIG. 7/S114). In addition, if the position of the main body 10 is constrained in the first target position range while the posture of the main body 10 is deviated from the first target posture range, it is acceptable to determine the first posture deviation only. On the other hand, if the posture of the main body 10 is constrained in the first target posture range while the position of the main body 10 is deviated from the first target position range, it is acceptable to determine the first position deviation only. Thereafter, on the basis of either one or both of the first position deviation and the first posture deviation, the motions of the leg joint mechanism group and the like are controlled so as to change the position or the like of the main body 10 through making a part of or the entire part of the plurality of legs 14 of the robot 1 leave the floor and land on the floor and then stop to stand again in the first specified area (FIG. 7/S116). Thereby, the position and the like of the main body 10 can be corrected through the foot-stepping of the robot 1.

On the other hand, when the first controlling element 110 determines that the first position/posture condition has been satisfied (FIG. 7/S104 . . . YES), as illustrated in FIG. 9(c), the second controlling element 120 controls the motions of the leg joint mechanism group to make the robot 1 move backward from the first specified area to the second specified area and then stand in the second specified area with the position and the posture of the main body 10 following a second target path (FIG. 7/S106).

When the robot 1 is standing in the second specified area, the first controlling element 110 determines whether or not a second position/posture condition has been satisfied (FIG. 7/S108). The second position/posture condition is a condition where the position of the main body 10 is constrained in a second target position range with a second target position as a reference and the posture of the main body 10 is constrained in a second target posture range with a second target posture as a reference. The second target position range and the second target posture range are defined from the viewpoint of making the robot 1 execute certainly a specified task. The second target position range and the second target posture range are stored in a storing unit. Each relative position and each relative posture of the main body 10 with respect to the second floor mark $FM_2$ are determined as the position and the posture of the main body 10. The position and the posture of the second floor mark $FM_2$ with respect to the waist camera $C_2$ is determined through the waist camera $C_2$; on the basis of the determination result and the positions and the postures of the waist camera $C_2$ or the like in the robot coordinate system which are stored preliminarily in the storing unit, the relative position and the relative posture of the main body 10 with respect to the second floor mark $FM_2$ can be determined. The position and the posture of the main body 10 may be determined on the basis of outputs from other sensors according to an inverse dynamic or geometric computation model, for example, on the basis of output signals from rotary encoders denoting angles of each joint mechanism, and the length or the like of each link stored preliminarily in a storing unit. Moreover, whether or not the second position/posture condition is satisfied may be determined by determining whether or not each position and each posture of the second floor mark $FM_2$ determined via the waist camera $C_2$ when the robot 1 is standing in the first specified area is identical to or in a predefined error range of the target position and target posture of the second floor mark $FM_2$ stored in a storing unit.

When the first controlling element 110 determines that the second position/posture condition has not been satisfied (FIG. 7/S108 . . . NO), the deviation of the position of the main body 10 from the second target position is determined as a second position deviation and the deviation of the posture of the main body 10 from the second target posture is determined as a second posture deviation (FIG. 7/S118). In addition, if the position of the main body 10 is constrained in the second target position range while the posture of the main body 10 is deviated from the second target posture range, it is acceptable to determine the second posture deviation only. On the other hand, if the posture of the main body 10 is constrained in the second target posture range while the position of the main body 10 is deviated from the second target position range, it is acceptable to determine the second position deviation only. The second position deviation and the second posture deviation vary according to asymmetry or the like of the characteristics of the motions of the robot 1 when the robot 1 moves from the first specified area to the second specified area, such as the inclination angle of the floor, the evenness of the floor, the variations on friction coefficients between the foot and the floor, the elasticity of the elastic element 152 of the left and the right feet 15 of the robot 1, and the like.

Figure 10:
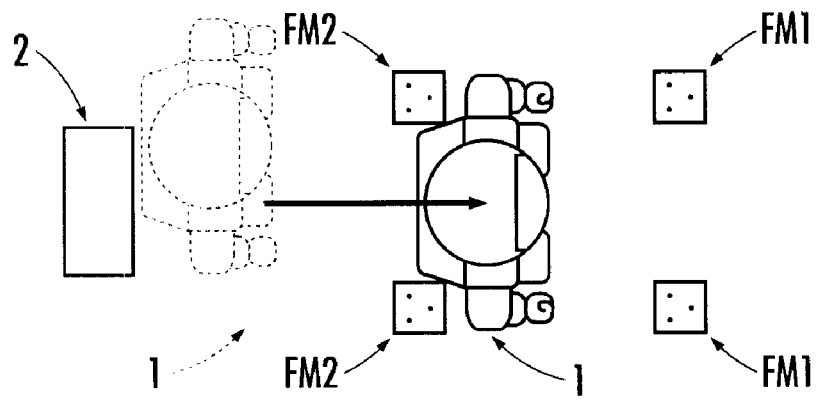
FIG. 10a is an explanatory diagram related to the position and posture of the main body of the present invention.
FIG. 10b is an explanatory diagram related to the second target after correction of the present invention.
Figure 10:
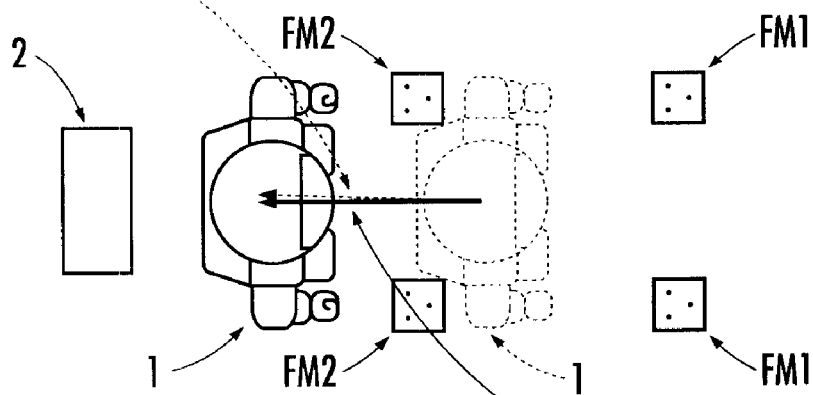

Thereafter, the second target path is corrected by the second controlling element 120 in such a way that either one or both of a subsequent second position deviation and a subsequent second posture deviation is smaller than either one or both of the current second position deviation and the current second posture deviation when the robot 1 moves from the first specified area to the second specified area and stands there in the future (FIG. 7/ S120). Then, the motions of the leg joint mechanism group or the like are controlled in such a way that the robot 1 moves from the second specified area to the first specified area and stands there as illustrated in FIG. 10(*a*) with the position and the posture of the main body 10 following the first target path (FIG. 7/ S102). Thereafter, on condition that it is determined that the first position/ posture condition has been satisfied (FIG. 7/ S104...YES), the motions of the leg joint mechanism group or the like are controlled in such a way that the robot 1 moves from the first specified area to the second specified area and stands there as illustrated in FIG. 10(*b*) with the position and the posture of the main body 10 following the corrected second target path (FIG. 7/ S108). Thereby, the trajectory of the position of the main body 10 is varied from the trajectory of a dashed arrow line in FIG. 10(*b*) defined according to the second target path before correction (FIG. 9(C) arrow) to the trajectory of a solid line in FIG. 10(*b*) defined according to the corrected second target path.

On the other hand, when the first controlling element 110 determines that the second position/posture condition has been satisfied (FIG. 7/S108 . . . YES), the second controlling element 120 controls the motions of the robot 1 to start executing or continue executing a specified task (FIG. 7/S110). Subsequently, the first controlling element 110 determines whether or not the specified task has been finished by the robot 1 (FIG. 7/S112). If the determination result is negative (FIG. 7/S112 . . . NO), the robot 1 is controlled to continue the specified task (FIG. 7/S110). On the other hand, if it is determined that the specified task has been finished (FIG. 7/S112 . . . YES), the aforementioned series of processes are terminated.

The execution method of a specified task by the robot 1 will be described hereinafter. On condition that it is determined that the first mark $M_1$ attached to the heel (back side of the foot 15) of the robot 1 standing in the second specified area has been detected by the first sensor 211 (FIG. 8/S202 . . . YES) and the second mark $M_2$ attached to the back of the main body 10 of the robot 1 has been detected by the second sensor 212 in the charging unit 2 (FIG. 8/S204 . . . YES), the second connector 2200 is driven by the connector driving mechanism 2300 to move forward or to move in a direction approaching the first connector 1200 (FIG. 8/S206).

Figure 8:
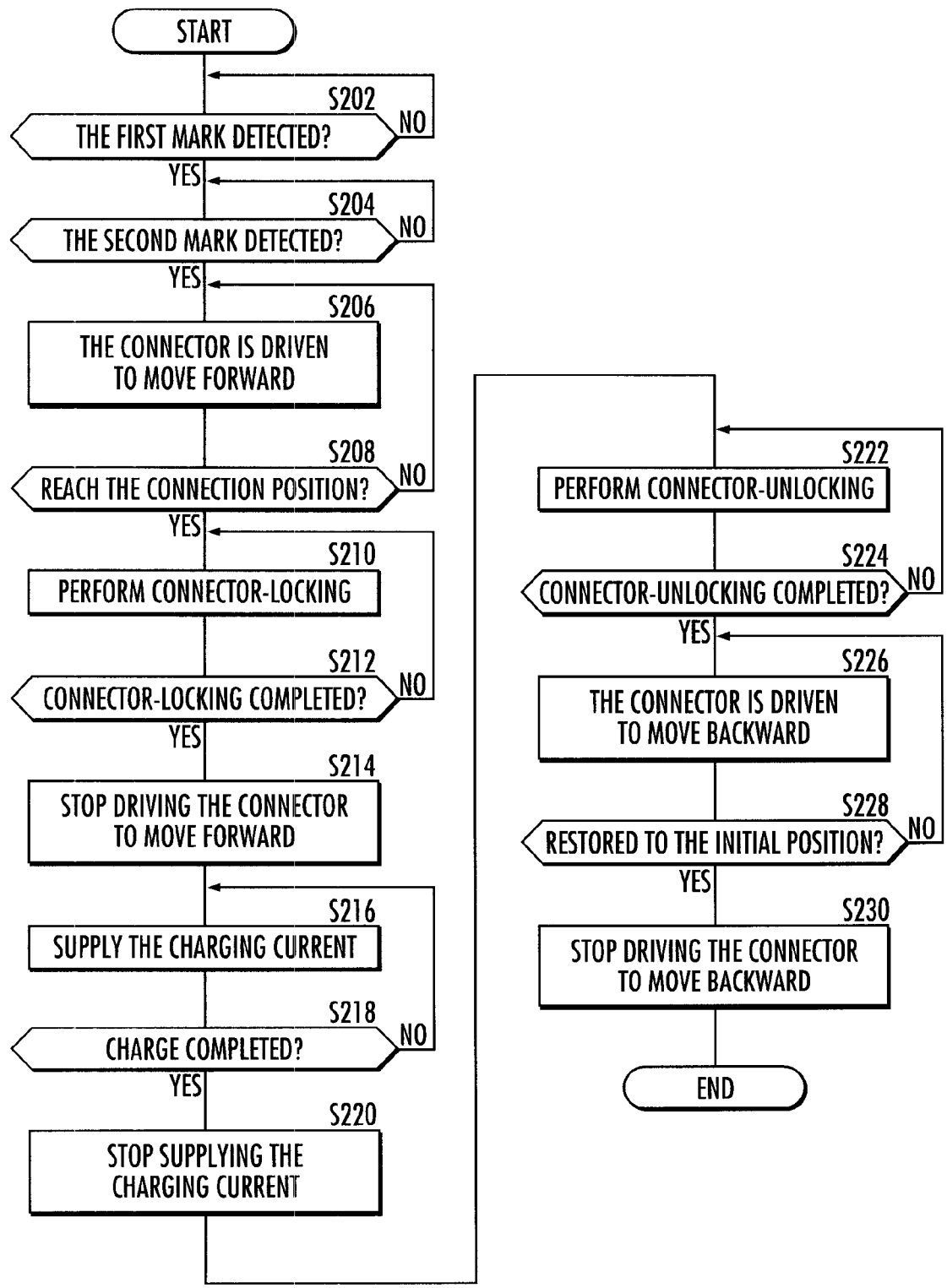
FIG. 8 is a flow chart illustrating an execution method of a first specified task and a second specified task.

After the second connector 2200 has reached a connection position within a predefined duration (FIG. 8/S208 . . . YES), the connector-locking is performed (FIG. 8/S210). When the second connector 2200 has been at the connection position, the end portion of the rod 2260 is inserted into the tube 1260 and the pins 2270 are guided into the end portion of the guide 1270. The connector-locking is performed by the rod rotating mechanism 2360 to drive the rod 2260 rotating axially in a defined direction. At this moment, the second connector 2200 is driven to move forward so as to assist the connector-locking. Thus, while the pins 2270 protruded from the side wall of the rod 2260 being guided by the guide 1270 of the tube 1260, the rod 1260 is inserted gradually into the rod 2260, the pins 2270 reaches to the end portion of the guide 1270 and engages thereto, the connector-locking is realized to enable the second connector 2200 and the first connector 1200 in a connected state. In other words, the second charging terminal 2220 and the first charging terminal 1220 are connected, and the second signal terminal 2240 and the first signal terminal 1240 are connected.

Thereafter, if the rod rotating mechanism 2360 determines that the connector-locking has been finished according to the rotation angle of the rod 2260 (FIG. 8/S212 . . . YES), the forward driving of the second connector 2200 is terminated (FIG. 8/S214). Then, the charging controller 200 recognizes the residual amount or the like of the battery 1100 according to communications with the controller 100 via the first signal terminal 1240 and the second signal terminal 2240, and supplies charging current to the battery 1100 from the charging power source 2100 via the first charging terminal 1220 and the second charging terminal 2220 (FIG. 8/S216). The charging controller 200 stops supplying the charging current from the charging power source 2100 to the battery 1100 (FIG. 8/S220) when the charging controller 200 determines the charging of the battery 1100 has been finished according to output signals from the controller 100 (FIG. 8/S218 . . . YES). Hitherto, the robot 1 has performed the specified task of charging the battery 1100 with the charging unit 2 after connecting the second connector 2200 to the first connector 1200.

Subsequently, the connector-unlocking is performed (FIG. 8/S222). In detail, the rod 2260 is driven to rotate axially in a direction opposite to the direction when the connector-locking is performed by the rod rotating mechanism 2360. Moreover, the second connector 2200 may be driven to move backward so as to assist the connector-unlocking. Thereby, while the pins 2270 protruded from the side wall of the rod 2260 being guided by the guide 1270 of the tube 1260, the rod 2260 is drawn out gradually from the tube 1260; the connector-unlocking is realized. Consequently, the first charging terminal 1220 is separated from the second charging terminal 2220 and the first signal terminal 1240 is separated from the second signal terminal 2240, the second connector 2200 is drawn out of the first connector 1200.

Thereafter, when the rod rotating mechanism 2360 determines that the connector-unlocking has been finished according to the rotation angle of the rod 2260 (FIG. 8/S224 . . . YES), the second connector 2200 is driven to move backward by the connector driving mechanism 2300 (FIG. 8/S226). When it is determined that the second connector 2200 has been restored to the initial position (FIG. 8/S228 . . . YES), the backward moving of the second connector 2200 is stopped (FIG. 8/S230). Hitherto, the robot 1 has performed the task of removing the second connector 2200 from the first connector 1200.

According to the robot 1 with the aforementioned functions, the sufficiency of the first position/posture condition is determined. When the determination result is affirmative, the robot 1 moves from the first specified area to the second specified area with the position and the posture of the main body 10 following the second target path (refer to FIG. 7/S104 . . . YES, S106 and FIG. 9(*c*)). On the other hand, when the determination result is negative, the current starting point of the second target path is adjusted by making the robot 1 perform foot-stepping in the first specified area so as to satisfy the first position/posture condition (refer to FIG. 7/S104 . . . NO. S116). Thereby, the target position and the target posture of the main body 10 at the starting point of the second target path after the correction, namely, the target position and the target posture of the main body 10 when the robot 1 is standing in the first specified area after the correction is adjusted substantially identical to that before the correction (refer to FIG. 9(*b*) and FIG. 10(*a*)).

The sufficiency of the second position/posture condition when the robot 1 is standing in the second specified area, namely, whether or not the position and the posture of the main body 10 are appropriate from the viewpoint of making the robot 1 execute a specified task is determined. When the determination result is affirmative, the robot 1 executes the specified task (refer to FIG. 7/S108 . . . YES, S110 and FIG. 8). On the other hand, when the determination result is negative, the second position deviation (=deviation of the position of the main body with respect to the second target position) and the second posture deviation (=deviation of the posture of the main body with respect to the second target posture) when the robot 1 is standing in the second specified area are measured (refer to FIG. 7/S118). On the basis of either one or both of the current second position deviation and the current second posture deviation, the second target path is corrected so as to make either one or both of a subsequent second position deviation and a subsequent second posture deviation smaller (refer to FIG. 7/S120). Moreover, the robot moves from the second specified area to the first specified area with the position and the posture of the main body 10 following the first target path (refer to FIG. 7/S102 and FIG. 10($a$)). Thereafter, the robot 1 returns again to the second specified and stands there with the position and the posture of the main body 10 following the corrected second target path (refer to FIG. 10($b$)). In other words, the robot returns to the first specified temporarily from the second specified area where the robot is standing, and then moves back again to the second specified area and stands there. Thereby, the current position or the like of the main body 10 when the robot 1 moves from the first specified area to the second specified area and stands in the second specified area is closer to the second target position or the like than the previous position or the like of the main body 10 when the robot 1 moves from the first specified area to the second specified area and stands in the second specified area in the previous time (refer to FIG. 9($c$) and FIG. 10($b$)). In other words, the position or the like of the main body 10 of the robot 1 can be adjusted appropriately from the viewpoint of executing a specified task in the second specified area. For example, even the second position/posture condition is not satisfied when the robot 1 is standing in the second specified area due to reasons related to asymmetry or the like of the characteristics of the motions of the robot 1 when the robot 1 moves from the first specified area to the second specified area, such as the inclination angle of the floor, the evenness of the floor, the variations on friction coefficients between the foot and the floor, the elasticity of the elastic element 152 of the left and the right feet 15 of the robot 1, and the like, the position and the posture of the main body 10 when the robot 1 is standing in the second specified area can be corrected appropriately.

It is acceptable to determine the second position deviation and the second posture deviation and correct the second target path according to the determination result without considering the determination result on the sufficiency of the second position/posture condition (refer to FIG. 7/S108, S118 and S120). Thereby, every time when the robot 1 executes a specified task, the second target path is corrected to make either one or both of the second position deviation and the second posture deviation smaller.

It is also acceptable to determine the first position deviation and the first posture deviation and correct the position or the like of the main body 10 through foot-stepping according to the determination result without considering the determination on the sufficiency of the first position/posture condition (refer to FIG. 7/S104, S118 and S120). Further, the determination on the sufficiency of the first position/posture condition may be omitted. Furthermore, the determination of the first position deviation and the first posture deviation, and the correction on the position or the like of the main body 10 through the foot-stepping by the robot 1 may be also omitted (refer to FIG. 7/S104, S114 and S116).

It is acceptable for the robot 1 to execute various specified tasks different from the specified task mentioned above. Despite that any of the specified tasks is executed, as mentioned above, the robot 1 can adjust the position and the posture of the main body 10 in the second specified area appropriately from the viewpoint of executing the specified task.

Figure 11:
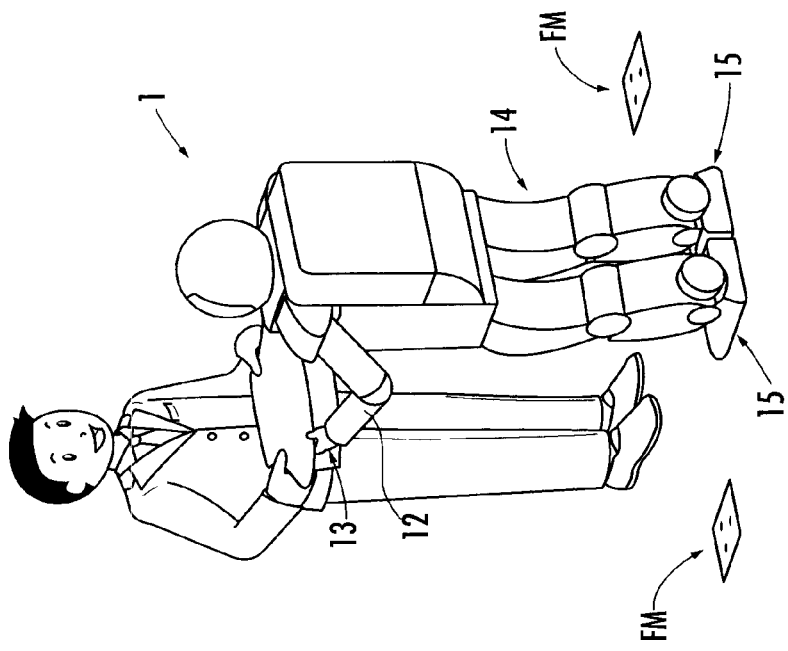
FIG. 11a is an explanatory diagram related to execute a specified task of holding a tray of the present invention.
FIG. 11c is an explanatory diagram related to execute a specific task of passing a target object of the present invention.
Figure 11:
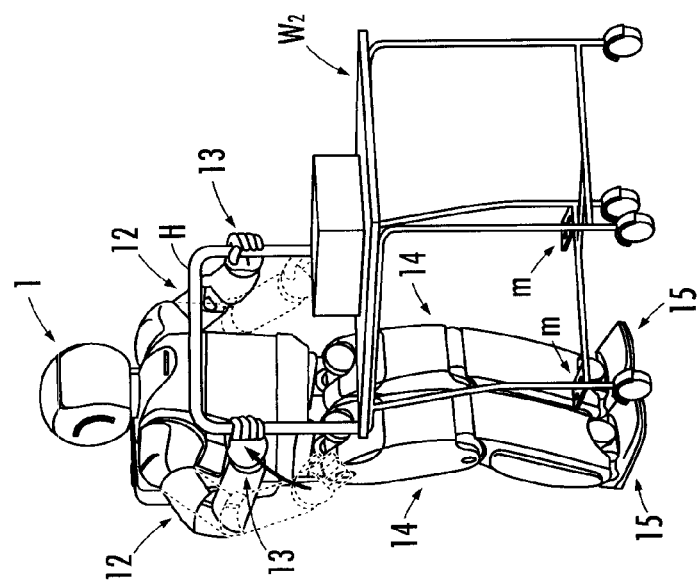
Figure 11:
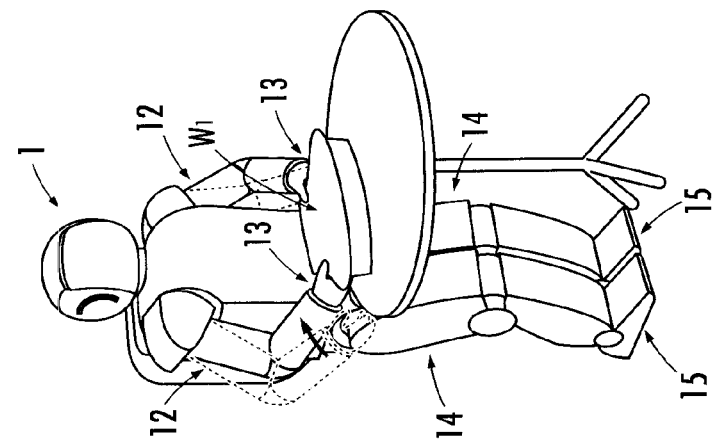

As illustrated in FIG. 11($a$), for example, it is acceptable for the robot 1 to execute a specified task of holding a tray (target object) $W_1$ with the hands 13 by moving the arms 12 or the like when the robot 1 is standing in the second specified area. The robot 1 firstly recognizes the position and the posture of the tray $W_1$ according to an image of the tray $W_1$ photographed by the head camera $C_1$, then determines whether or not the second position/posture condition has been satisfied according to whether the position and the posture of the tray $W_1$ are identical to the reference position and the reference posture stored in a storing unit, respectively.

As illustrated in FIG. 11($b$), it is acceptable for the robot 1 to execute a specified task of holding a handle (target object) H of a trolley $W_2$ or the like by moving the arms 12 or the like when the robot 1 is standing in the second specified area. The robot 1 firstly recognizes the position and the posture of the trolley $W_2$ according to an image of a mark M attached to the lower side of the trolley $W_2$ which is photographed by the waist camera $C_2$, then determines whether or not the second position/posture condition has been satisfied according to whether the position and the posture of the trolley $W_2$ are identical to the reference position and the reference posture stored in a storing unit, respectively. In this situation, it is assumed that the position or the like of the target object is deviated somehow from the position that the target object should be when the robot is standing in the second specified area. Nevertheless, even in this situation, as mentioned above, the robot 1 can adjust the position and the posture of the main body 10 in the second specified area appropriately from the viewpoint of executing the specified task.

As illustrated in FIG. 11($c$), it is acceptable for the robot 1 to execute a specified task of passing a target object such as the tray $W_1$ or the like held in the hands 13 to a human or another robot 1 by moving the arms 12 or the like when the robot 1 is standing in the second specified area. The robot 1 firstly recognizes the position and the posture of a floor mark FM according to an image of the floor mark FM photographed by the waist camera $C_2$, then determines whether or not the second position/posture condition has been satisfied according to whether the position and the posture of the tray $W_1$ are the same with the reference position and the reference posture stored in a storing unit, respectively. In this situation, it is assumed that the position or the like of the human or the other robot 1 is deviated somehow from the position that the human or the other robot 1 should be when the robot is standing in the second specified area. Nevertheless, even in this situation, as mentioned above, the robot 1 can adjust the position and the posture of the main body 10 in the second specified area appropriately from the viewpoint of executing the specified task.

What is claimed is:

1. A robot which is provided with a main body, a plurality of legs connected to the main body and a controller, each of the plurality of legs comprises a joint mechanism, and is capable of moving autonomously with repeated motions involving leaving a floor and landing on the floor of the plurality of legs controlled by the controller, wherein the controller is provided with a first controlling element configured to determine whether or not a first position/posture condition where a position of the main body is constrained in a first target position range with a first target position as a reference and a posture of the main body is constrained in a first posture range with a first target posture as a reference has been satisfied when the robot is standing in a first specified area, and to determine a deviation of the position of the main body from a second target position as a second position deviation and a deviation of the posture of the main body from a second target posture as a second posture deviation when the robot is standing in a second specified area for executing a specified task involving an interaction with a target object, and a second controlling element configured to correct a second target path on the basis of either one or both of a current second position deviation and a current second posture deviation determined by the first controlling element so as to make either one or both of a subsequent second position deviation and a subsequent second posture deviation smaller after the robot has been controlled to move from the first specified area to the second specified area and stand in the second specified area with the position and posture of the main body following the second target path on condition that the first controlling element determines that the first position/posture condition has been satisfied, wherein the second controlling element, on condition that the first controlling element determines that the first position/posture condition has not been satisfied, controls the robot to vary either one or both of the position and posture of the main body by making a part of or the entire part of the plurality of legs of the robot which is standing in the first specified area leave the floor and land on the floor and stand again in the first specified area on the basis of either one or both of the position deviation of the main body from the first target position and the posture deviation of the main body from the first target posture.

2. The robot according to claim 1, wherein the second controlling element controls the robot to move from the first specified area to the second specified area and stand in the second specified area with the position and posture of the main body following the corrected second target path after the robot has been controlled to move from the second specified area to the first specified area and stand in the first specified area with the position and posture of the main body following a first target path.

3. The robot according to claim 2, wherein the first controlling element determines whether or not a second position/posture condition where the position of the main body is constrained in a second target position range with the second target position as a reference and the posture of the main body is constrained in a second posture range with the second target posture as a reference has been satisfied, and the second controlling element controls the robot to execute the specified task on condition that the first controlling element determines that the second position/posture condition has been satisfied, or controls the robot to move from the second specified area to the first specified area and stand in the first specified area with the position and posture of the main body following the first target path on condition that the first controlling element determines that the second position/ posture condition has not been satisfied.

4. The robot according to claim 1, further provided with a battery and a first connector, and the specified task includes a second connector serving as the target object being driven by a driving device disposed with a charging unit to have a connection with the first connector such that the battery is charged by the charging unit.

5. The robot according to claim 1, further provided with an arm connected to the main body and a hand connected to a tip end of the arm, and the specified task includes holding the target object with the hand or releasing the target object from the hand.

* * * * *